United States Patent
Wang et al.

(10) Patent No.: US 10,764,960 B2
(45) Date of Patent: Sep. 1, 2020

(54) WIRELESS SENSOR NETWORK AND PARAMETER OPTIMIZATION METHOD THEREOF, AND WAREHOUSE SYSTEM

(71) Applicants: Delta Electronics Int'l (Singapore) Pte Ltd, Singapore (SG); Nanyang Technological University, Singapore (SG)

(72) Inventors: Yuan Wang, Singapore (SG); Wee Peng Tay, Singapore (SG); Jack Sheng Kee, Singapore (SG); Karthikeyan Thangamariappan, Singapore (SG)

(73) Assignees: DELTA ELECTRONICS INT'L (SINGAPORE) PTE LTD, Singapore (SG); NANYANG TECHNOLOGICAL UNIVERSITY, Singapore (SG)

( * ) Notice: Subject to any disclaimer, the term of this patent is extended or adjusted under 35 U.S.C. 154(b) by 121 days.

(21) Appl. No.: 16/177,880

(22) Filed: Nov. 1, 2018

(65) Prior Publication Data
US 2020/0146103 A1 May 7, 2020

(51) Int. Cl.
H04L 1/00 (2006.01)
H04W 84/20 (2009.01)
H04W 4/38 (2018.01)
H04L 1/18 (2006.01)
H04W 52/02 (2009.01)
H04W 4/33 (2018.01)

(52) U.S. Cl.
CPC ........... *H04W 84/20* (2013.01); *H04L 1/1816* (2013.01); *H04W 4/33* (2018.02); *H04W 4/38* (2018.02); *H04W 52/0264* (2013.01)

(58) Field of Classification Search
CPC ......... H04W 84/20; H04W 4/38; H04W 4/33; H04W 52/0264; H04L 1/1816
See application file for complete search history.

(56) References Cited

U.S. PATENT DOCUMENTS 7,077,318 B2    7/2006  Venema et al.

*Primary Examiner* — Abdelillah Elmejjarmi
(74) *Attorney, Agent, or Firm* — Kirton McConkie; Evan R. Witt

(57) ABSTRACT

A wireless sensor network includes an aggregator, a control device, a bridge device, and a mesh module. The control device is connected with the aggregator and the bridge device. The mesh module is wirelessly connected with the bridge device and the control device. A mesh network is built by the connections of the mesh module, the bridge device, and the control device. A duty cycle of the mesh module is less than or substantially equal to 10 percent. A command sent by the aggregator is converted into a wireless message by the control device, the wireless message is transmitted by the control device and retransmitted through a first amount of radios and repeated for a second amount of times by the bridge device, so that the wireless message is successfully received by the mesh module. Therefore, a mesh network with high efficiency and low cost is achieved.

12 Claims, 16 Drawing Sheets

1

WIRELESS SENSOR NETWORK AND PARAMETER OPTIMIZATION METHOD THEREOF, AND WAREHOUSE SYSTEM

FIELD OF THE DISCLOSURE

The present disclosure relates to a wireless sensor network (WSN), and more particularly to a wireless sensor network, a parameter optimization method thereof based on Bluetooth Low Energy (BLE) mesh network, and a warehouse system applying the wireless sensor network.

BACKGROUND OF THE DISCLOSURE

Internet of Things (IoT) is a popular technology in next generation. Especially, the Industrial Internet of Things (IIoT) is regarded as the fourth revolution in industrial automation. It encompasses a wide range of next generation technologies. The wireless sensor network (hereinafter "WSN") plays an important role in the field. The WSN market was valued at USD 29.06 Billion in 2016. The WSN market is expected to reach USD 93.86 Billion by 2023.

Wireless technologies come in various shapes and sizes, and one size does not fit all applications. Mainstream wireless sensor networks target low volume and less responsive applications. In industry of the future, there will be some selective deployments where need for high dense WSN. High dense deployments can be termed as WSN having density larger than 5 nodes per cubic meters and larger than 5000 nodes in the local network. These dense WSN deployments are typically found for applications such as warehouse inventory management and inventory track-and-trace. The preferred characteristics of such applications includes high scalability, high reliability, high data rate for control signals, high range, low power-consumption, and low cost. However, none of a wireless technology having advantages exactly fitting such applications.

Therefore, how to develop a wireless sensor network and a parameter optimization method thereof that can solve the drawbacks in prior arts, have advantages fitting the applications, is substantially the urgent problem that must be solved right now.

SUMMARY OF THE DISCLOSURE

It is an object of the present disclosure to provide a wireless sensor network and a parameter optimization method thereof, and a warehouse system in order to overcome the above-mentioned drawbacks encountered by the prior arts.

The present disclosure provides a wireless sensor network, a parameter optimization method thereof, and a warehouse system with a wireless sensor network. By utilizing a mesh network, the range and the efficiency of the wireless sensor network are increased. The duty cycle of the mesh module may be less than 10 percent and adjustable to meet the power-consumption demands to save the energy. Meanwhile, the bridge device may be a pure repeating device that retransmits the wireless message through multiple radios, such that there is high probability of the mesh module to receive the wireless message without always turning on. Especially when the wireless sensor network is battery-powered, the lower the duty cycle, the lower the power-consumption.

The present disclosure also provides a wireless sensor network, a parameter optimization method thereof, and a warehouse system applying a wireless sensor network. When the wireless sensor network is mains-powered, the duty cycle of the mesh module may be adjusted to 100 percent, so that the average response time may be extremely shortened. The bridge device may be eliminated under this structure of the wireless sensor network. A mesh network with high efficiency and low cost is achieved.

The present disclosure also provides a wireless sensor network, a parameter optimization method thereof, and a warehouse system with a wireless sensor network. Comparing with the conventional technologies of prior arts, the present disclosure provides highly resilient and cost effective WSN with verified performance in industrial environment. Since the data can be encrypted, the wireless sensor network has a high security. In addition, an addition mesh module or a defective mesh module can be easily added and removed with no change of the structure or the configuration of the WSN. Performance may be independent of network size and node locality, in which the WSN can scale up to 65,000 mesh modules. Moreover, a localization as a supplementary service can be implemented.

In accordance with an aspect of the present disclosure, a wireless sensor network is provided. The wireless sensor network includes an aggregator, a control device, at least one bridge device, and at least one mesh module. The control device is connected with the aggregator. The at least one bridge device is connected with the control device. The at least one mesh module is wirelessly connected with the at least one bridge device and the control device. A mesh network is built by the connections of the at least one mesh module, the at least one bridge device, and the control device. A duty cycle of the at least one mesh module is less than or substantially equal to 10 percent. A command sent by the aggregator is converted into a wireless message by the control device, the wireless message is transmitted by the control device and retransmitted through a first amount of radios and repeated for a second amount of times by the at least one bridge device, the first amount is larger than or substantially equal to 1 and less than or substantially equal to 60, and the second amount is larger than or substantially equal to 2 and less than or substantially equal to 10, so that the wireless message is successfully received by the mesh module.

In accordance with another aspect of the present disclosure, another wireless sensor network is provided. The wireless sensor network includes an aggregator, a control device, and at least one mesh module. The control device is connected with the aggregator. A command sent by the aggregator is converted into a wireless message by the control device, and the wireless message is transmitted by the control device. The at least one mesh module is wirelessly connected with the control device. A Bluetooth Low Energy mesh network is built by the connection of the at least one mesh module and the control device.

In accordance with another aspect of the present disclosure, a parameter optimization method of a wireless sensor network is provided. The parameter optimization method includes steps of providing a Bluetooth Low Energy mesh network with connections of a control device, at least one bridge device and at least one mesh module, wherein a wireless message is transmitted by the control device and retransmitted through a first amount of radios and repeated for a second amount of times by the bridge device; performing a numerical analysis with a uniformity, wherein the uniformity equals to one minus the ratio of a number of empty time slots to a total number of the minor time slots; calculating to obtain a first optimal value of the first amount and a second optimal value of the second amount; and utilizing the first optimal value and the second optimal value as parameters of the at least one bridge device.

In accordance with further another aspect of the present disclosure, a warehouse system with a wireless sensor network using a parameter optimization method is provided. The warehouse system includes a wireless sensor network a wireless sensor network and at least one BLE-enabled device. The wireless sensor network includes a control device and at least one mesh module wirelessly connected with the control device. A wireless message is transmitted by the control device. A Bluetooth Low Energy mesh network is built at least by the connection of the at least one mesh module and the control device, and the mesh module is operated as a beacon submitting beacon signals. The beacon signals are received and processed by the BLE-enabled device, so that the BLE-enabled device is localized.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

Figure 1:
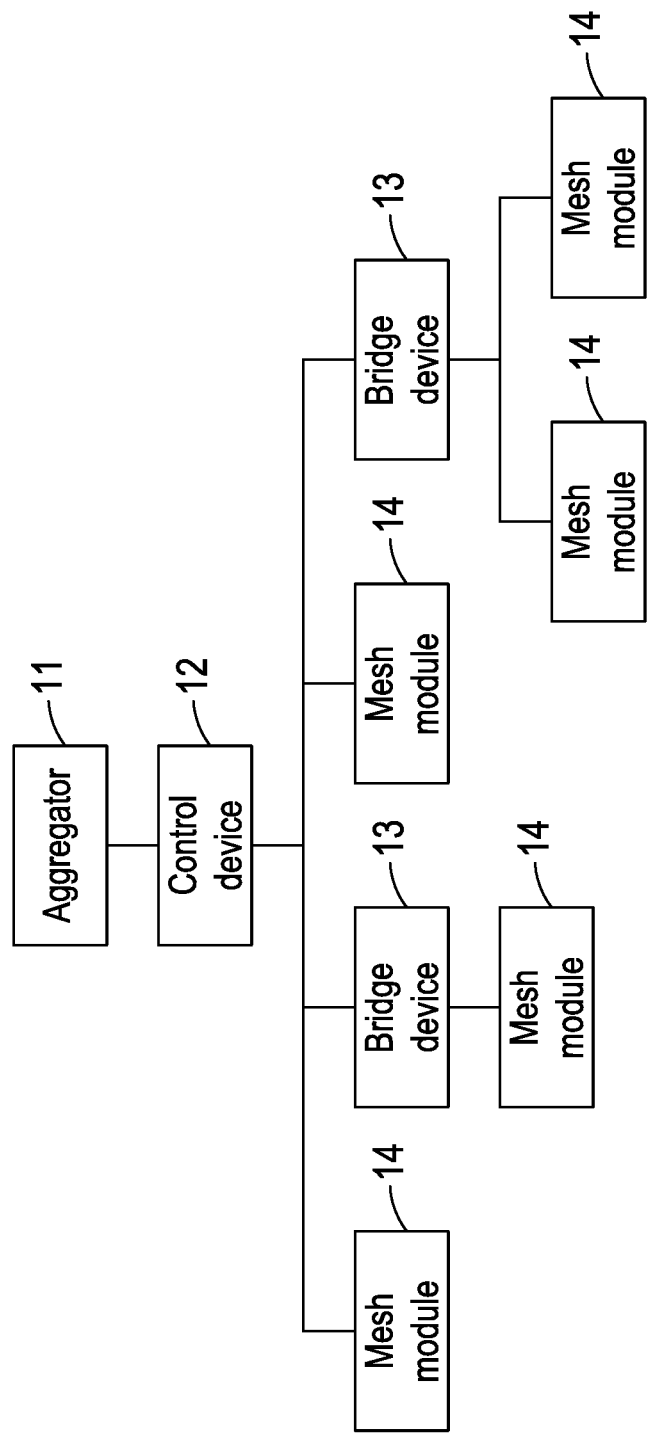
FIG. 1 schematically illustrates the configuration of a wireless sensor network according to an embodiment of the present disclosure.

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed. The present disclosure may repeat reference numerals and/or letters in the various examples. This repetition is for the purpose of simplicity and clarity and does not in itself dictate a relationship between the various embodiments and/or configurations discussed. Although the wide numerical ranges and parameters of the present disclosure are approximations, numerical values are set forth in the specific examples as precisely as possible. Besides, "and/or" and the like may be used herein for including any or all combinations of one or more of the associated listed items. While the numerical ranges and parameters set forth for the broad scope of the present invention are approximations, the numerical value reported in the specific examples set forth as accurately as possible. However, any numerical values inherently contain certain errors necessarily the standard deviation found in the respective testing measurements caused. Also, as used herein, the term "about" generally means away from a given value or a range of 10%, 5%, 1% or 0.5%. Alternatively, the word "about" means within an acceptable standard error of ordinary skill in the art-recognized average. In addition to the operation/working examples, or unless otherwise specifically stated otherwise, in all cases, all of the numerical ranges, amounts, values and percentages, such as the number for the herein disclosed materials, time duration, temperature, operating conditions, the ratio of the amount, and the like, should be understood as the word "about" decorator. Accordingly, unless otherwise indicated, the numerical parameters of the present invention and scope of the appended patent proposed is to follow changes in the desired approximations. At least, the number of significant digits for each numerical parameter should at least be reported and explained by conventional rounding technique is applied. Herein, it can be expressed as a range between from one endpoint to the other or both endpoints. Unless otherwise specified, all ranges disclosed herein are inclusive.

Figure 2:
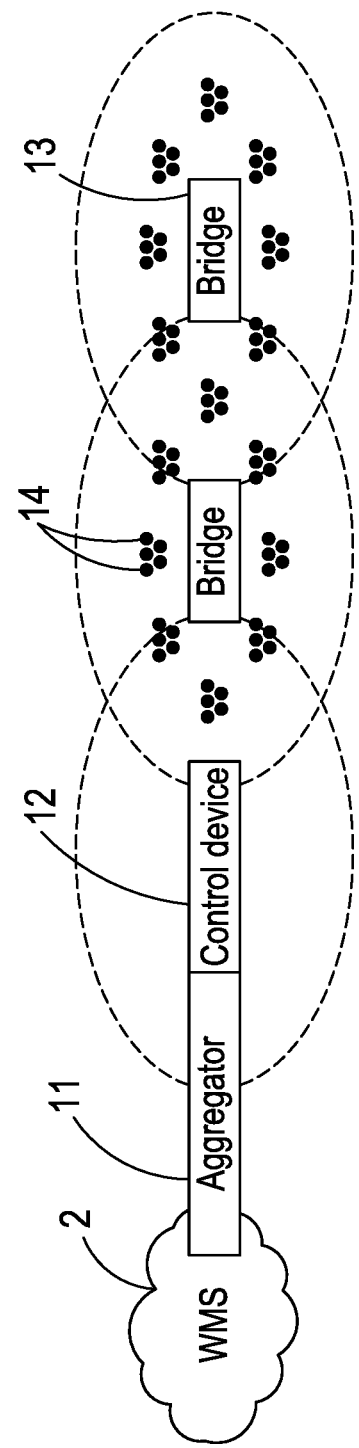
FIG. 2 schematically illustrates the structure of a wireless sensor network connected with a warehouse management system (WMS)

Please refer to FIG. 1 and FIG. 2. FIG. 1 schematically illustrates the configuration of a wireless sensor network (hereinafter "WSN") according to an embodiment of the present disclosure. FIG. 2 schematically illustrates the structure of a wireless sensor network connected with a warehouse management system (hereinafter "WMS"). As shown in FIG. 1 and FIG. 2, a wireless sensor network 1 according to an embodiment of the present disclosure includes an aggregator 11, a control device 12, at least one bridge device 13, and at least one mesh module 14. The aggregator 11 is connected with a warehouse management system (WMS), or another internet protocol (IP) network, but not limited herein. The control device 12 is connected with and deployed at the aggregator 11. The at least one bridge device 13 is connected with the control device 12. Specifically, the control device 12 may be physically connected with the aggregator 11 and wirelessly connected with the at least one bridge device 13. The at least one mesh module 14 is wirelessly connected with at least one of the at least one bridge device 13 and the control device 12. A mesh network is built by the connections of the at least one mesh module 14, the at least one bridge device 13, and the control device 12. In the mesh network, any relay-enabled node will replay the message transmitted in the mesh network to increase the range of the mesh network. A command sent by the aggregator 11 is converted into a wireless message by the control device 12.

In particular, the mesh network is not limited to a Bluetooth Low Energy (hereinafter "BLE") mesh network. The WSN implementation may be over BLE mesh protocol, which may be a non-standard flood-based protocol that can be implemented over BLE 4.2. The control device 12 is not limited to include a controller, which may be USB dongle based, that can translate between BLE mesh network and the aggregator 11 (or the WMS 2 connected with the aggregator 11). The at least one bridge device 13 may be a pure repeater capable of retransmitting BLE mesh messages through multiple radios to increase the probability of connectivity, such that the at least one mesh module 14 can successfully receive the wireless message. An implementation of the bridge device 13 may be a bridge array as shown in FIG. 2, but not limited herein. In some embodiments, the at least one mesh module 14 includes a wireless node, such as a pick-by-light node hosting a lighting device. In this configuration, the at least one mesh module 14 will not act as a relay. The lighting device is capable of showing different colors and the combinations thereof with visibility larger than 10 meters, but not limited herein. In the industrial applications, the at least one mesh module 14 may be powered by a battery and could last 0.5 years. Preferably, the at least one mesh module 14 may have diagnostic capability (e.g. for battery status).

Since the at least one mesh module 14 may be powered by a battery, the power-consumption should be considered. It is well known that a mesh module 14 with duty cycle substantially equal to 100 percent means that the mesh module 14 is always turned on to wait for receiving the wireless message. However, it costs the most power for waiting or listening the incoming messages. Under this circumstance, the wireless sensor network 1 of the present disclosure utilizes the at least one mesh module 14 with duty cycle being adjustable to increase power-saving efficiency. In some embodiments, the duty cycle of the at least one mesh module 14 is less than or substantially equal to 10 percent, but not limited herein. The wireless message may be transmitted by the control device 12 and retransmitted through a first amount of radios and repeated for a second amount of times by the at least one bridge device 13. The first amount may be larger than or substantially equal to 1 and less than or substantially equal to 60, and the second amount may be larger than or substantially equal to 2 and less than or substantially equal to 10, so that the probability of successfully sending the wireless message to the sleepy mesh module 14 could be enhanced to high enough to ensure that the wireless message may be successfully received by the mesh module 14.

Under the structure of the BLE mesh network, the data can be encrypted, so that the wireless sensor network has a high security. In addition, an addition mesh module 14 or a defective mesh module 14 may be easily added or removed without change of the structure or the configuration of the WSN. Performance is independent of network size and node locality, in which the WSN may scale up to 65,000 mesh modules.

Figure 3:
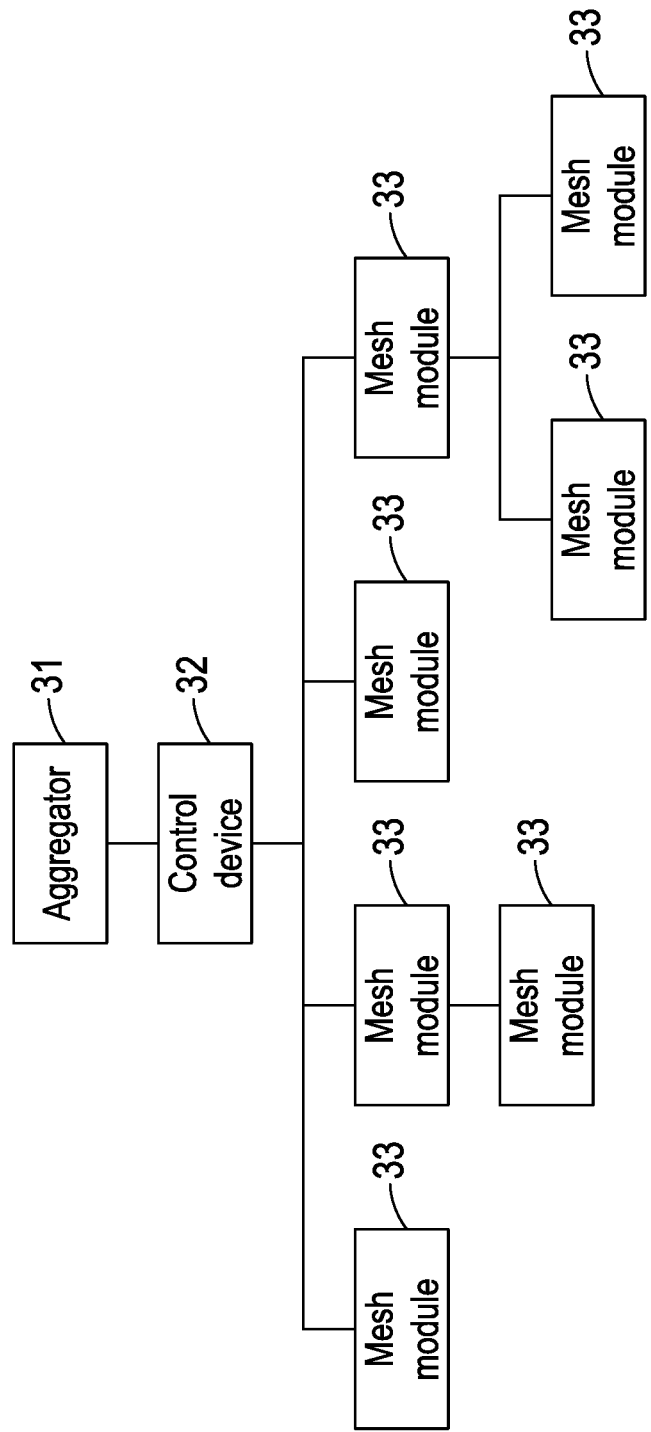
FIG. 3 schematically illustrates the configuration of a wireless sensor network according to another embodiment of the present disclosure.

Please refer to FIG. 3. FIG. 3 schematically illustrates the configuration of a wireless sensor network according to another embodiment of the present disclosure. As shown in FIG. 3, a wireless sensor network 3 according to another embodiment of the present disclosure includes an aggregator 31, a control device 32, and at least one mesh module 33. The control device 32 is connected with the aggregator 31. A command sent by the aggregator 31 is converted into a wireless message by the control device 32, and the wireless message is transmitted by the control device 32. The at least one mesh module 33 is wirelessly connected with the control device 32, wherein a Bluetooth Low Energy mesh network is built by the connection of the at least one mesh module 33 and the control device 32. The control device 32 includes a controller, which may be USB dongle-based. In this configuration, the at least one mesh module 33 may be a WSN node and act as a relay. Preferably, the at least one mesh module 33 in this configuration may be mains-powered as the power-consumption will be higher due to the default relay function requirement. Since the at least one mesh module 33 is mains-powered, the duty cycle of the at least one mesh module 33 can be adjusted to 100 percent to increase the response time. The response time is the time elapsed at the control device 32 from sending the wireless message to receiving a response of the mesh module 33.

Figure 4:
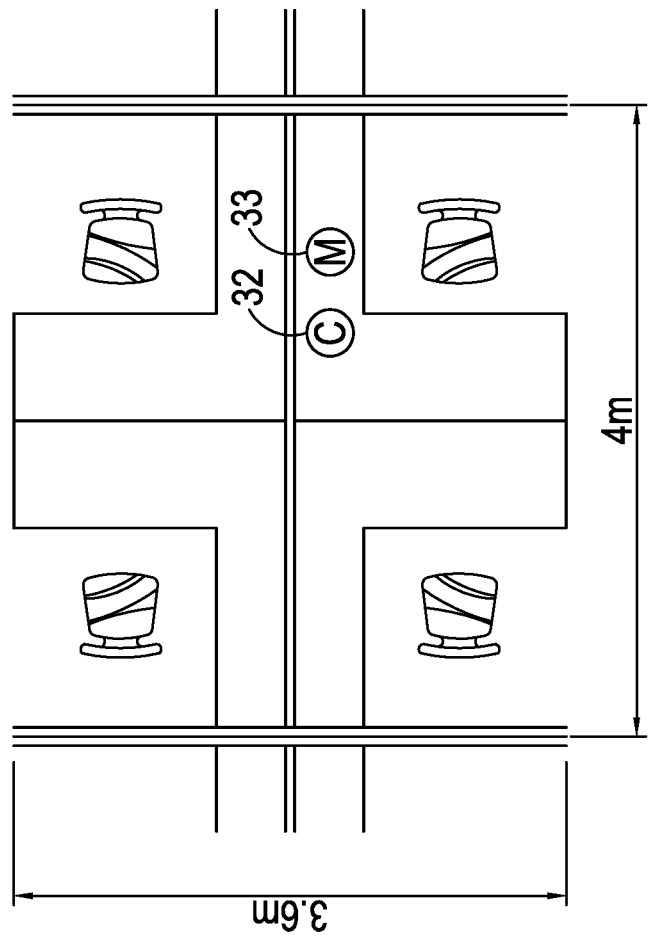
FIG. 4 schematically illustrates a control device and a mesh module of the present disclosure utilized in a room without a bridge device.
Figure 5:
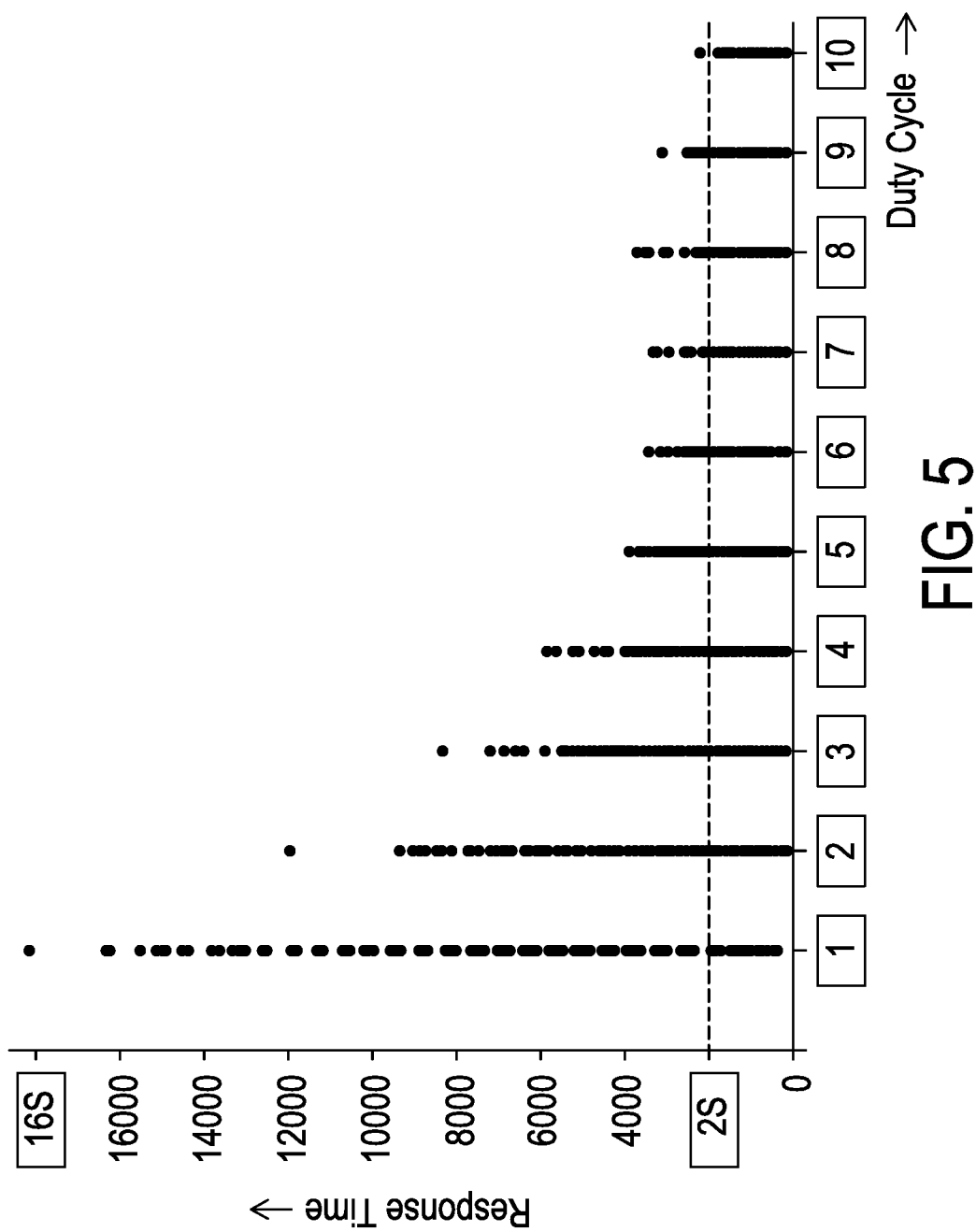
FIG. 5 schematically illustrates the scatter plot diagram of response time versus duty cycle of the control device and the mesh module shown in FIG. 4.
Figure 6:
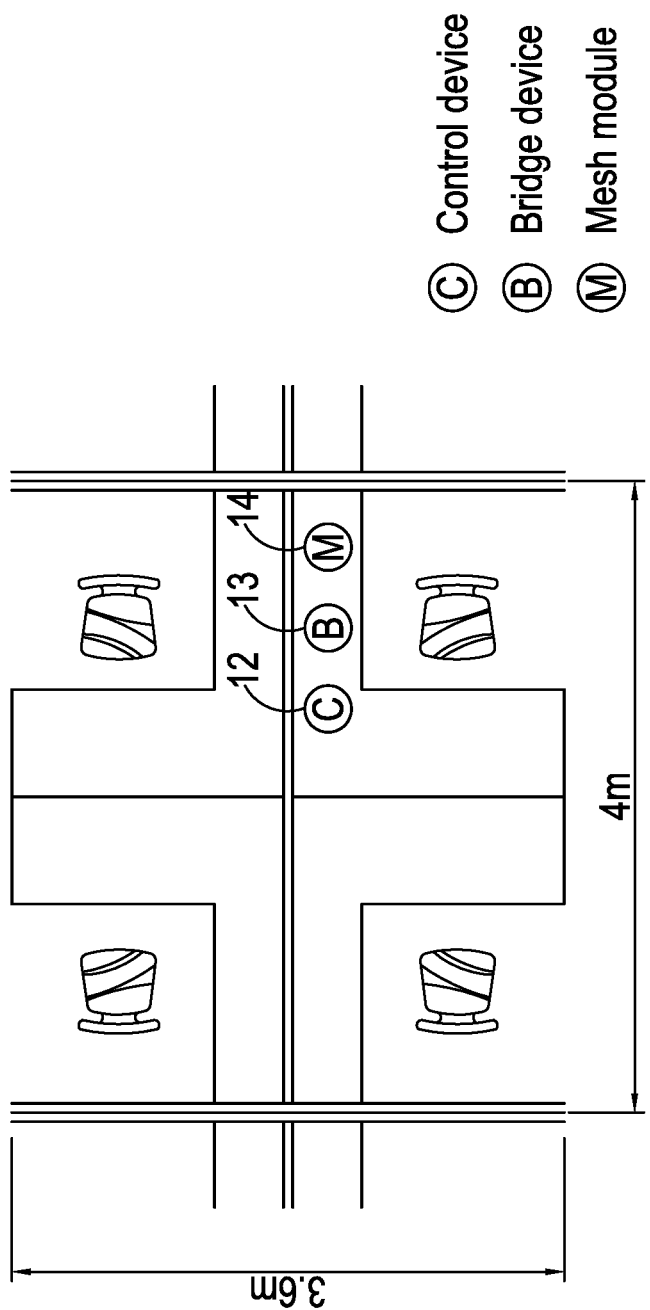
FIG. 6 schematically illustrates a control device and a mesh module of the present disclosure utilized in a room with a bridge device.
Figure 7:
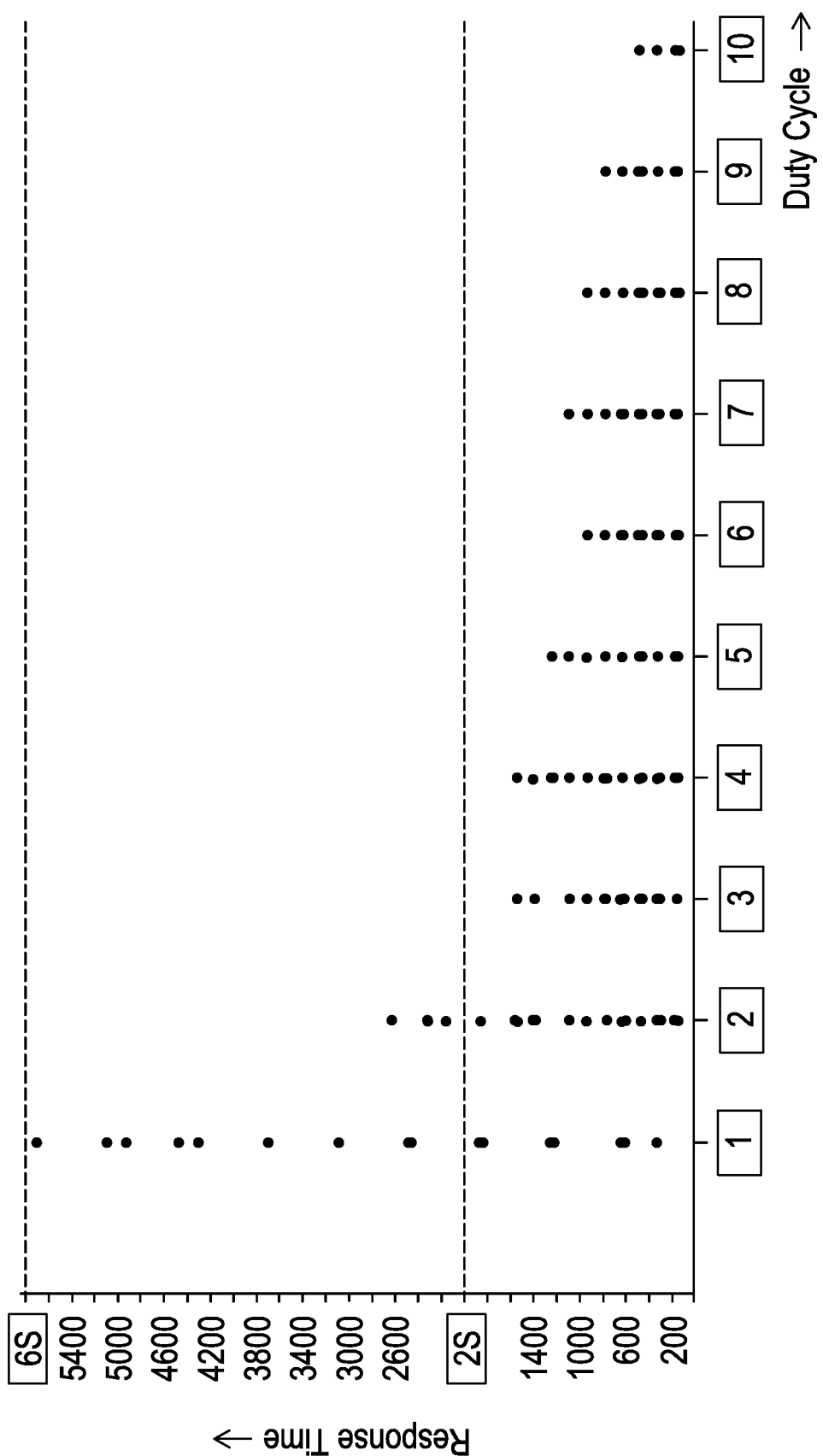
FIG. 7 schematically illustrates the scatter plot diagram of response time versus duty cycle of the control device and the mesh module with the bridge device shown in FIG. 6.

The differences between the two configurations mentioned above will be illustrated as follows. Please refer to FIGS. 1 and 3-7. FIG. 4 schematically illustrates a control device and a mesh module of the present disclosure utilized in a room without a bridge device. FIG. 5 schematically illustrates the scatter plot diagram of response time versus duty cycle of the control device and the mesh module shown in FIG. 4. FIG. 6 schematically illustrates a control device and a mesh module of the present disclosure utilized in a room with a bridge device. FIG. 7 schematically illustrates the scatter plot diagram of response time versus duty cycle of the control device and the mesh module with the bridge device shown in FIG. 6. A control device 32 and a mesh module 33 of the wireless sensor network 3 are disposed in a room shown in FIG. 4, and the area of the room is 4 m×3.6 m. The scatter plot diagram of the response time elapsed at the control device 32 from sending the wireless message to receiving a response of the mesh module 33 versus the duty cycle of the mesh module 33 is shown in FIG. 5.

Considering a wireless sensor network with a bridge device, a control device 12, a bridge device 13, and a mesh module 14 of the wireless sensor network 1 are disposed in a room shown in FIG. 6, and the area of the room is 4 m×3.6 m. The scatter plot diagram of the response time elapsed at the control device 12 from sending the wireless message to receiving a response of the mesh module 14 versus the duty cycle of the mesh module 14 is shown in FIG. 7. It should be noted that the response time of the wireless sensor network 1 with the duty cycle of the mesh module 14 equal to 3 percent is shorter than the response time of the wireless sensor network 3 with the duty cycle of the mesh module 33 equal to 10 percent. It is well known that the lower the duty cycle, the lower the power-consumption. The bridge device 13 substantially enhances the performance of the response time of the wireless sensor network 1.

Under the circumstances, it is recommended that the mesh module 14 of the wireless sensor network 1 could be battery-powered to lower the power-consumption, and the mesh module 33 of the wireless sensor network 3 could be mains-powered to shorten the response time, but not limited herein.

Figure 8:
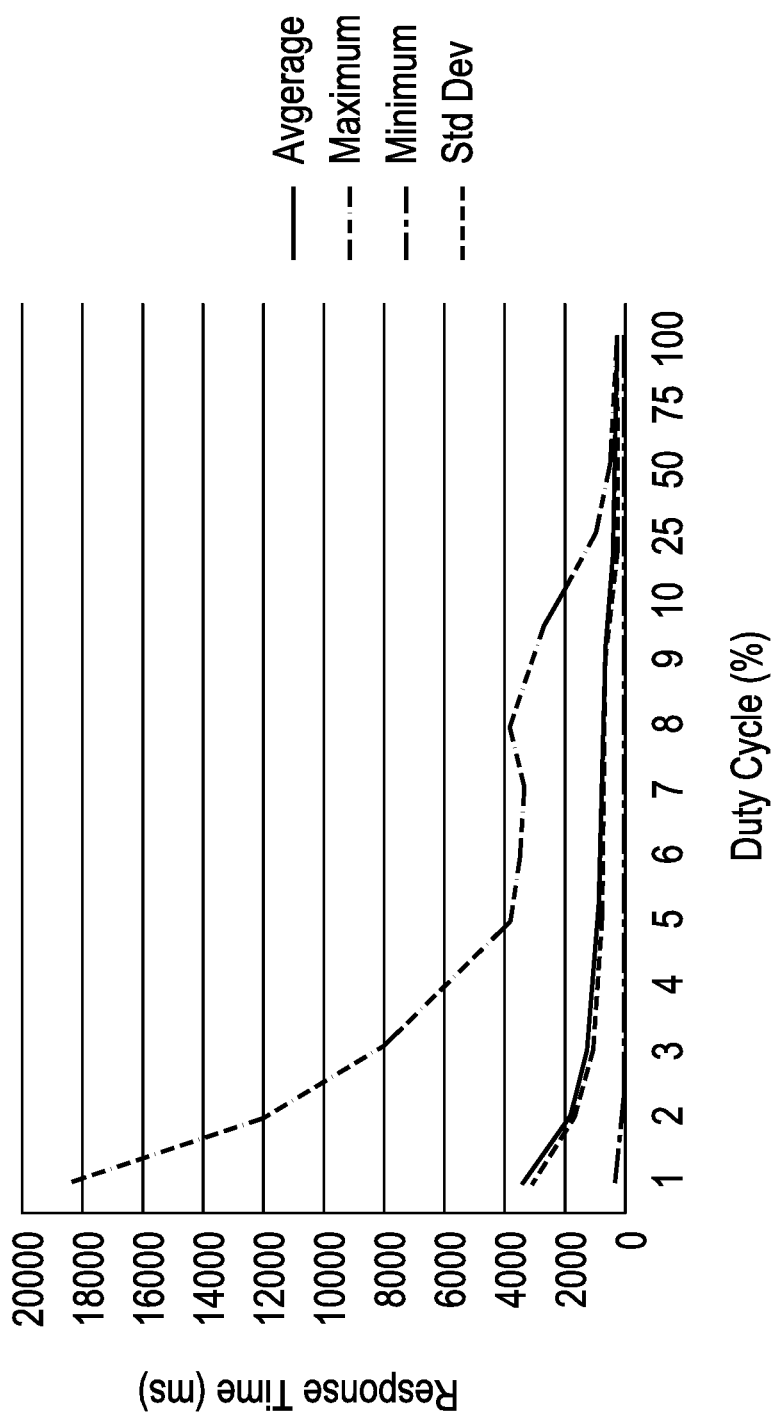
FIG. 8 schematically illustrates the response time-duty cycle diagram of the wireless sensor network and the mesh module thereof according to an embodiment of the present disclosure.
Figure 9:
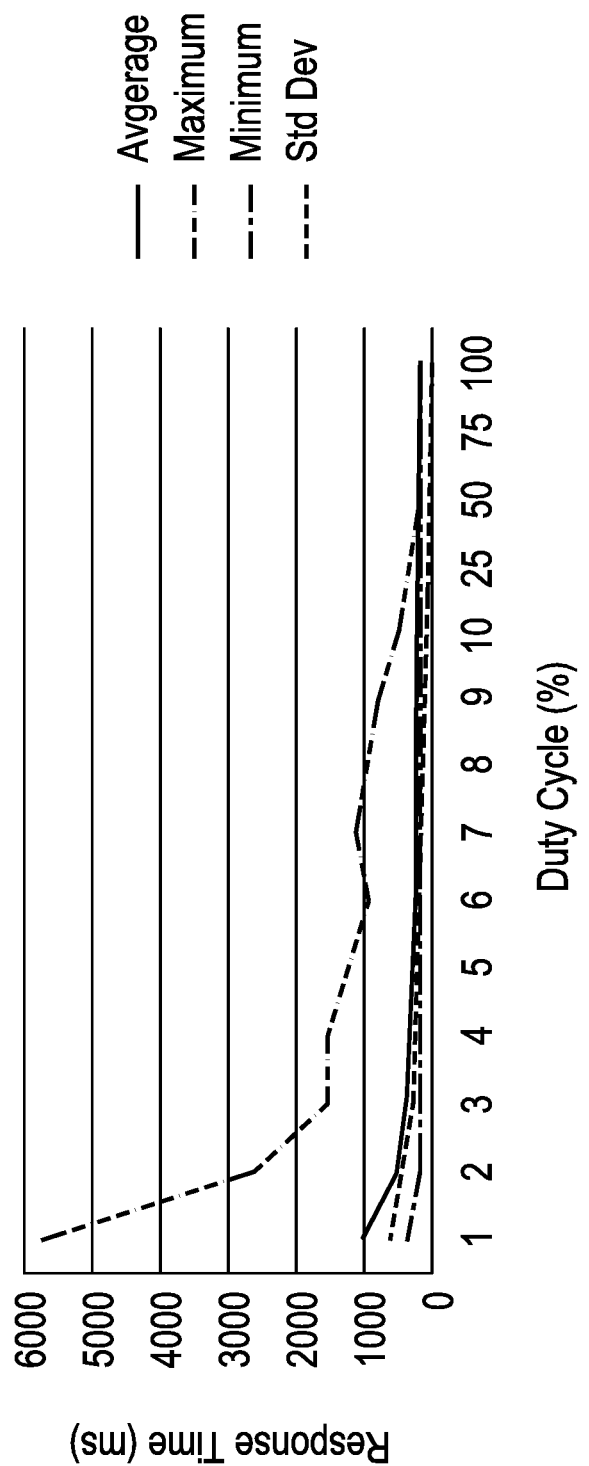
FIG. 9 schematically illustrates the response time-duty cycle diagram of the wireless sensor network and the mesh module thereof according to another embodiment of the present disclosure.
Figure 10:
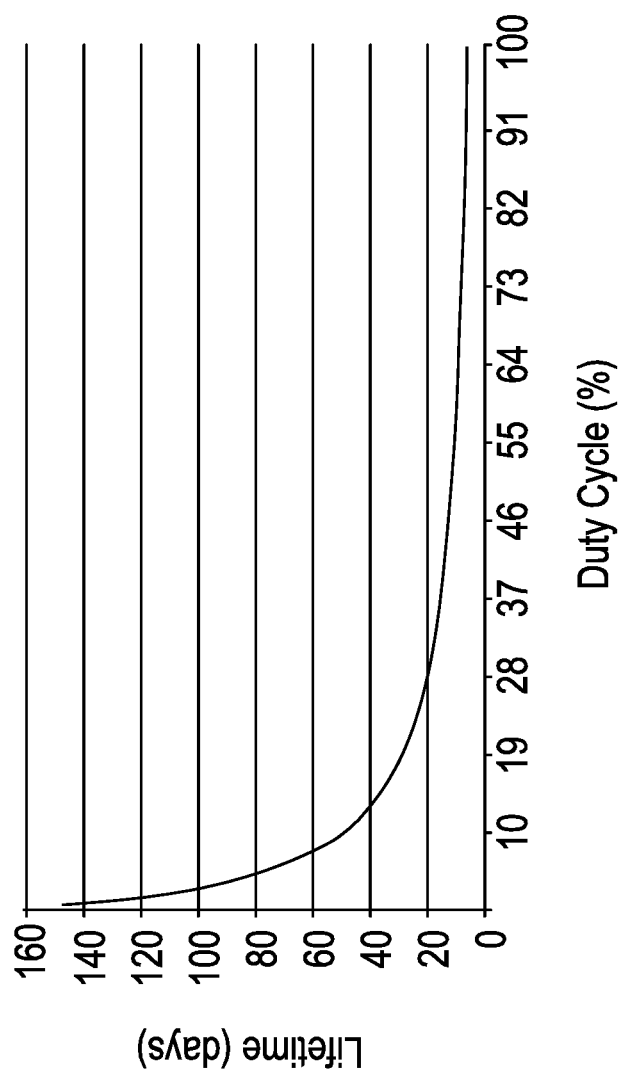
FIG. 10 schematically illustrates the diagram of the lifetime of a battery versus the duty cycle of the mesh module.

Please refer to FIGS. 8-10. FIG. 8 schematically illustrates the response time-duty cycle diagram of the wireless sensor network and the mesh module thereof according to an embodiment of the present disclosure. FIG. 9 schematically illustrates the response time-duty cycle diagram of the wireless sensor network and the mesh module thereof according to another embodiment of the present disclosure. FIG. 10 schematically illustrates the diagram of the lifetime of a battery versus the duty cycle of the mesh module. In an embodiment, the response time of the WSN has a good performance when the duty cycle of the mesh module is less than or elapsed equal to 10 percent. Moreover, when the duty cycle of the mesh module is less than or substantially equal to 10 percent and larger than or substantially equal to 5 percent, the performance of the response time may be acceptable for industrial application (as shown in FIG. 8). In another embodiment, the response time of the WSN has a good performance when the duty cycle of the mesh module is less than or substantially equal to 10 percent. In addition, when the duty cycle of the mesh module is less than or substantially equal to 10 percent and larger than or substantially equal to 3 percent, the performance of the response time may be acceptable for industrial application (as shown in FIG. 9). In both embodiments, the average response time elapsed at the control device from sending the wireless message to receiving a response of the mesh module is less than 2 seconds when the duty cycle of the mesh module is less than or substantially equal to 10 percent, and the average response time elapsed at the control device from sending the wireless message to receiving a response of the mesh module is less than 0.5 seconds when the duty cycle of the mesh module is close to 100 percent.

On the other hand, please refer to Table I below and FIG. 10. The lifetime of the battery powering the mesh module is longer when the duty cycle of the mesh module is less than or substantially equal to 10 percent. For example, when the duty cycle of the mesh module is 10 percent, the lifetime of the battery powering the mesh module is 46.85 days. When the duty cycle of the mesh module is 5 percent, the lifetime of the battery powering the mesh module is 75.36 days. When the duty cycle of the mesh module is 3 percent, the lifetime of the battery powering the mesh module is 99.60 days.

TABLE I

| Duty Cycle (%) | Lifetime (days) |
| --- | --- |
| 1 | 146.82 |
| 3 | 99.60 |
| 5 | 75.36 |
| 10 | 46.85 |
| 25 | 21.95 |
| 50 | 11.64 |
| 100 | 6.00 |

Figure 11:
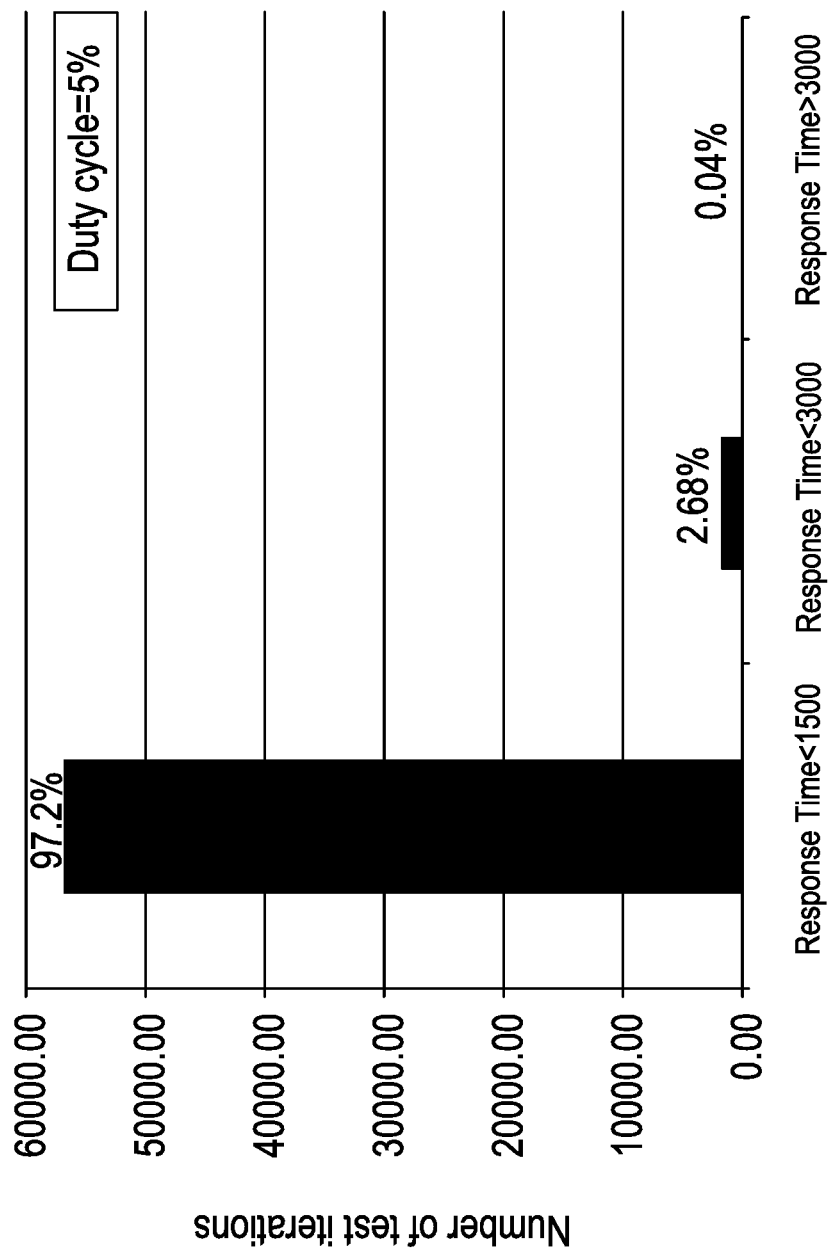
FIG. 11 schematically illustrates the histogram of number of test iterations versus response time of a mesh module of the present disclosure with duty cycle equal to 5 percent.
Figure 12:
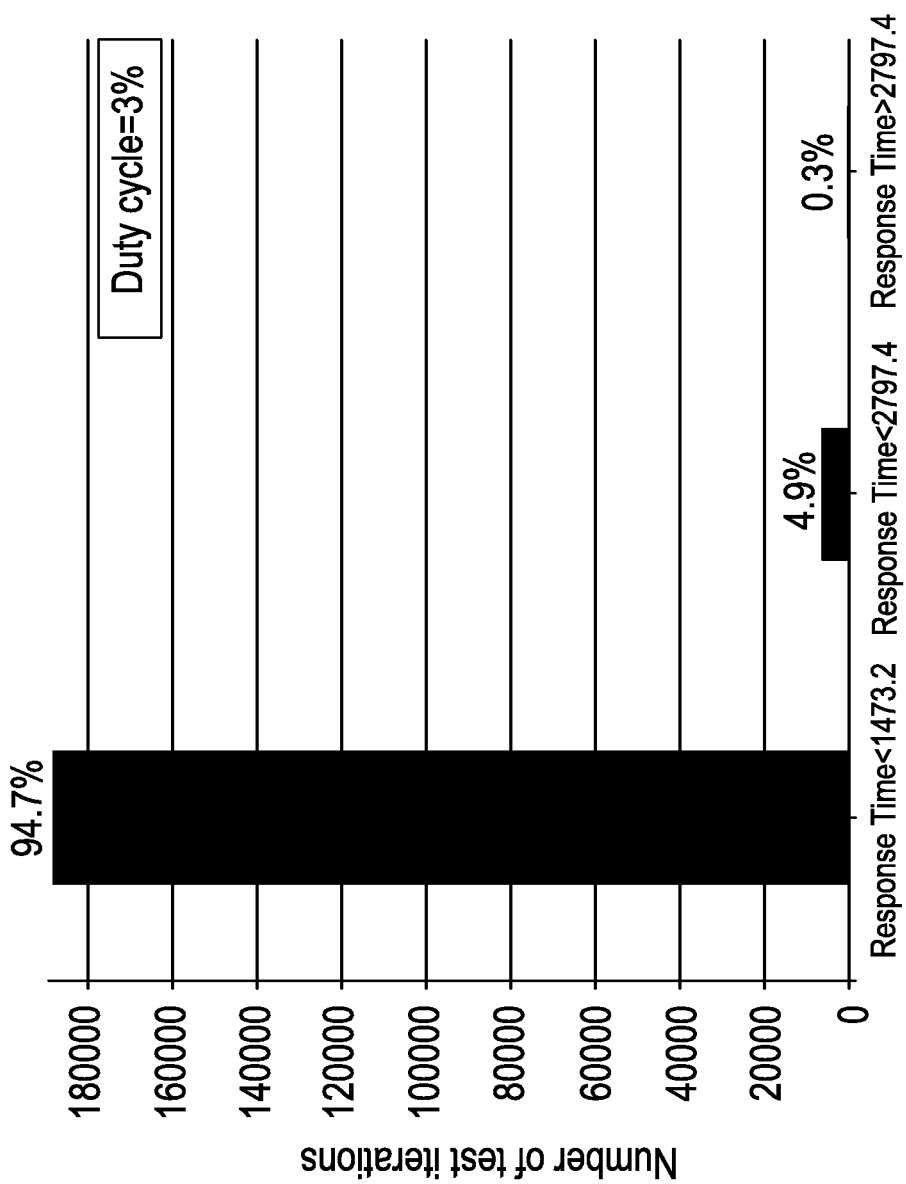
FIG. 12 schematically illustrates the histogram of number of test iterations versus response time of a mesh module of the present disclosure with duty cycle equal to 3 percent.

The following is the test results of the number of test iterations versus response time while duty cycle equals to 5% and 3%. Please refer to FIG. 11 and FIG. 12. FIG. 11 schematically illustrates the histogram of number of test iterations versus response time of a mesh module of the present disclosure with duty cycle equal to 5 percent. FIG. 12 schematically illustrates the histogram of number of test iterations versus response time of a mesh module of the present disclosure with duty cycle equal to 3 percent. As shown in FIG. 11 and FIG. 12, the results obtained are favorable, in which the reception rates are 100 percent, and the response time are within an acceptable range as good as the purpose of the present disclosure.

Figure 13:
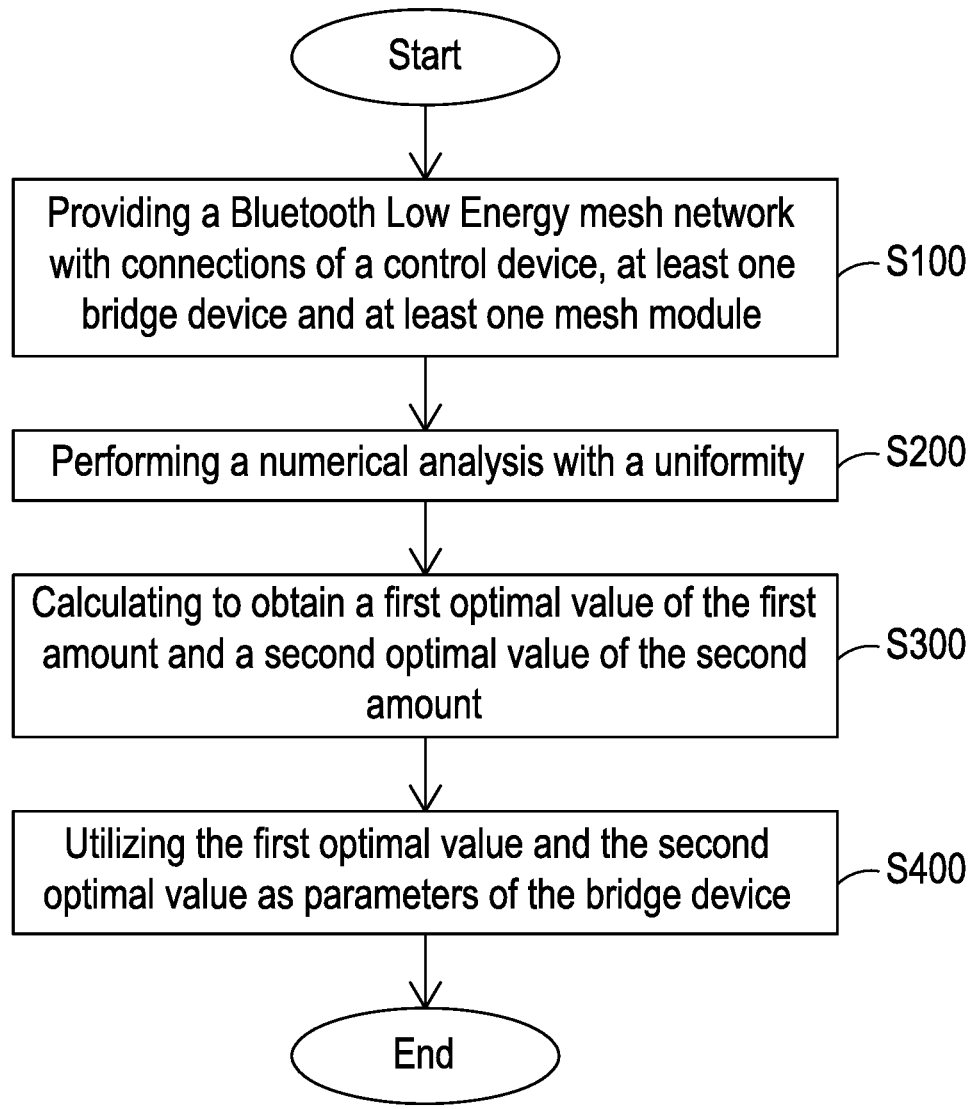
FIG. 13 schematically illustrates the flow chart of a parameter optimization method of a wireless sensor network according to an embodiment of the present disclosure.
Figure 14:
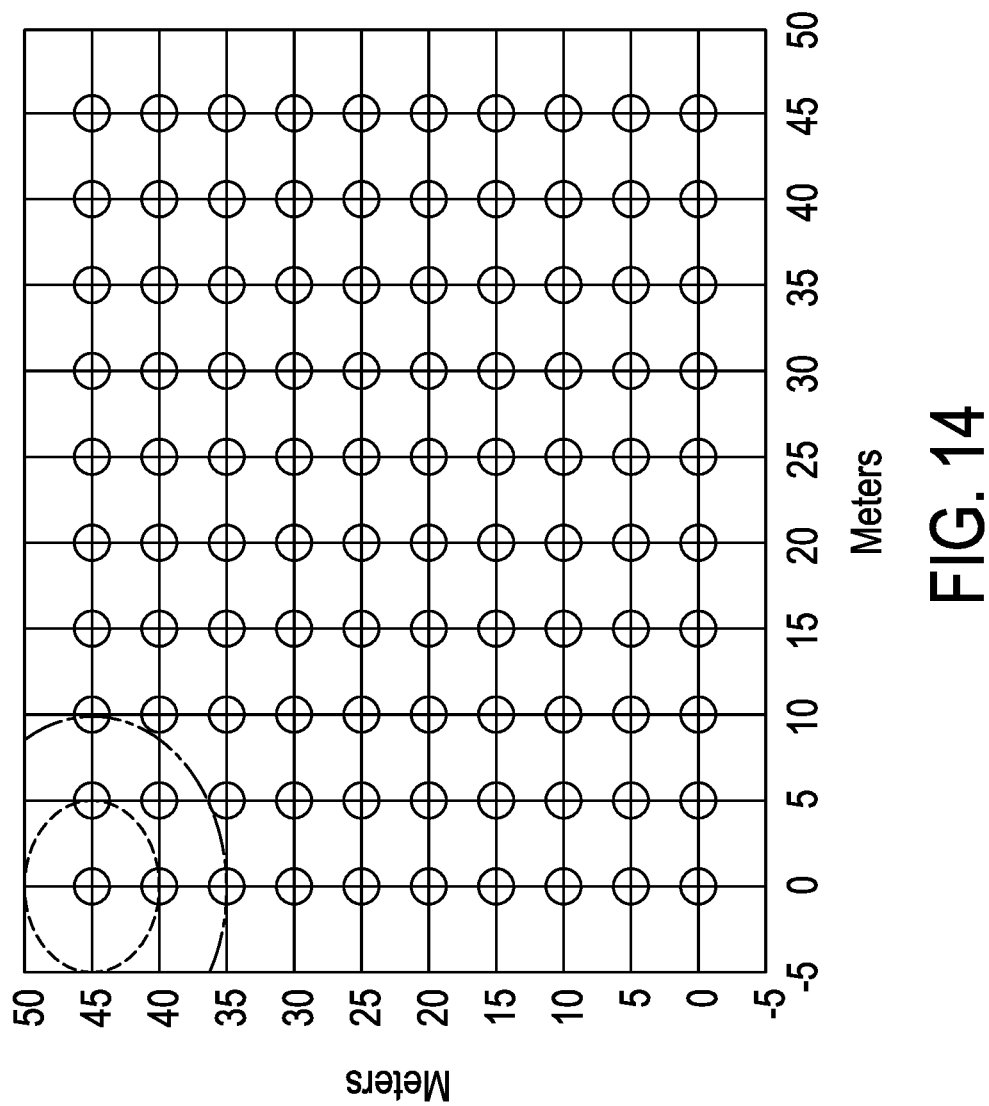
FIG. 14 schematically illustrates the diagram of a mesh network having 10×10 mesh modules.

Since the duty cycle has been fully discussed, the optimal values of the first amount and the second amount could be found to ensure the performance. Please refer to FIG. 13 and FIG. 14. FIG. 13 schematically illustrates the flow chart of a parameter optimization method of a wireless sensor network according to an embodiment of the present disclosure. FIG. 14 schematically illustrates the diagram of a mesh network having 10×10 mesh modules. As shown in FIG. 13 and FIG. 14, the parameter optimization method includes steps as follows. Firstly, as shown in step S100, providing a Bluetooth Low Energy mesh network with connections of a control device, at least one bridge device, and at least one mesh module. The wireless message is transmitted by the control device and retransmitted through a first amount of radios and repeated for a second amount of times by the bridge device. Next, performing a numerical analysis with a uniformity as shown in step S200. The uniformity equals to one minus the ratio of a number of empty time slots to a total number of the minor time slots. Then, as shown in step S300, calculating to obtain a first optimal value of the first amount and a second optimal value of the second amount. Finally, as shown in step S400, utilizing the first optimal value and the second optimal value as parameters of the bridge device (i.e. replacing the first amount and the second amount with the first optimal value and the second optimal value).

In order to maintain a response time performance (e.g. less than 2 seconds), one needs to maximize the chance of receiving a packet of a mesh module. It is essential for the bridge device to have multiple radios for retransmitting the wireless message and repeating for multiple times to overcome the limitation of the underlying BLE mesh network that the repeating period of sending operation of the bridge device may not be adjustable. However, allowing the bridge device to send the wireless message repeatedly is likely to cause collisions among the relayed messages if they are not distributed uniformly over a certain period of time. Therefore, it requires every bridge device to send the same wireless message uniformly in terms of time stamps, so that the chance of collisions can be reduced as much as possible. To this end, optimization of following parameters is necessary:

(i) The bridge array ratio $R_B$, denotes the number of radios in a single bridge device, i.e. the first amount.

(ii) The repeat count $C_R$, denotes the number of times by which a bridge device repeated for sending the wireless message, i.e. the second amount.

Considering the limitation of underlying BLE mesh network, and possible challenges of a normal direct mathematical modelling and optimization formulation, it is more practical to apply a numerical analysis based optimization scheme described in the sequel where the range of the bridge array ratio and the repeat count and may be set to be $1 \leq R_B \leq 60$ and $2 \leq C_R \leq 10$, respectively.

To capture how uniformly the relayed messages are distributed over a particular time span, using the uniformity as the performance metric would be more helpful. Dividing a time span of 1000 milliseconds into multiple minor slots evenly, each of which has a length of 7.5 milliseconds (this is the length of a single receiving operation of the mesh module). Then, the uniformity can be computed using the following equation:

$$U = 1 - \frac{|S_E|}{|S|}.$$

In the above expression, the notation |S| denotes the total number of the minor time slots, and $|S_E|$ denotes the number of the empty time slots (i.e., the slots in which no message relaying occurs). Thus, the selection of $R_B$ and $C_R$ could be optimal in the sense that it can lead to a score of uniformity as high as possible.

Through extensive real-world tests, it is noticed that different bridge devices worked independently in terms of the randomness of the hopping operation. This suggested that it is reasonable to select the optimal value of $C_R$ as the same with the optimal value obtained from the numerical analysis, by which $C_R^{optimal}=9$ is obtained. Then, a multi-hop network model shown in FIG. 14 is considered to optimally select the bridge array ratio where 100 bridge devices are arranged in the form of a 10×10 grid.

Due to multiple hops over bridge devices can cause traffic profile (from different bridge devices) aggregated in a mesh module, which may cause severe congestion within a certain period of time. Therefore, one needs to select the value of $R_B$ appropriately in the sense that the chance to cause degradation in uniformity can be reduced effectively.

To this end, a chart for scaling coefficients that capture the number of bridge devices, which are able to send wireless messages to a mesh module at the same time is built. The chart is obtained by computing the scaling coefficients at every possible locations (in the 10×10 grid shown in FIG. 14) where a mesh module may reside. It is revealed from the chart that the scaling coefficients could vary from 2 to 12, when communication range of the bridge devices varied from 5 meters to 10 meters. Based on this scaling coefficients range, the optimal selection of the bridge array ratio is obtained as $R_B^{optimal} \approx 2$.

In brief, the first optimal value of the first amount may be 2, and the second optimal value of the second amount may be 9. As shown in the step S400, the first amount is replaced by the first optimal value (i.e. 2), and the second amount is replaced by the second optimal value (i.e. 9).

On the other hand, it should be noted from FIG. 14 that when the amount of the mesh module is more than two, a distance between any two adjacent mesh modules of the mesh modules may be preferably 5 meters.

Figure 15:
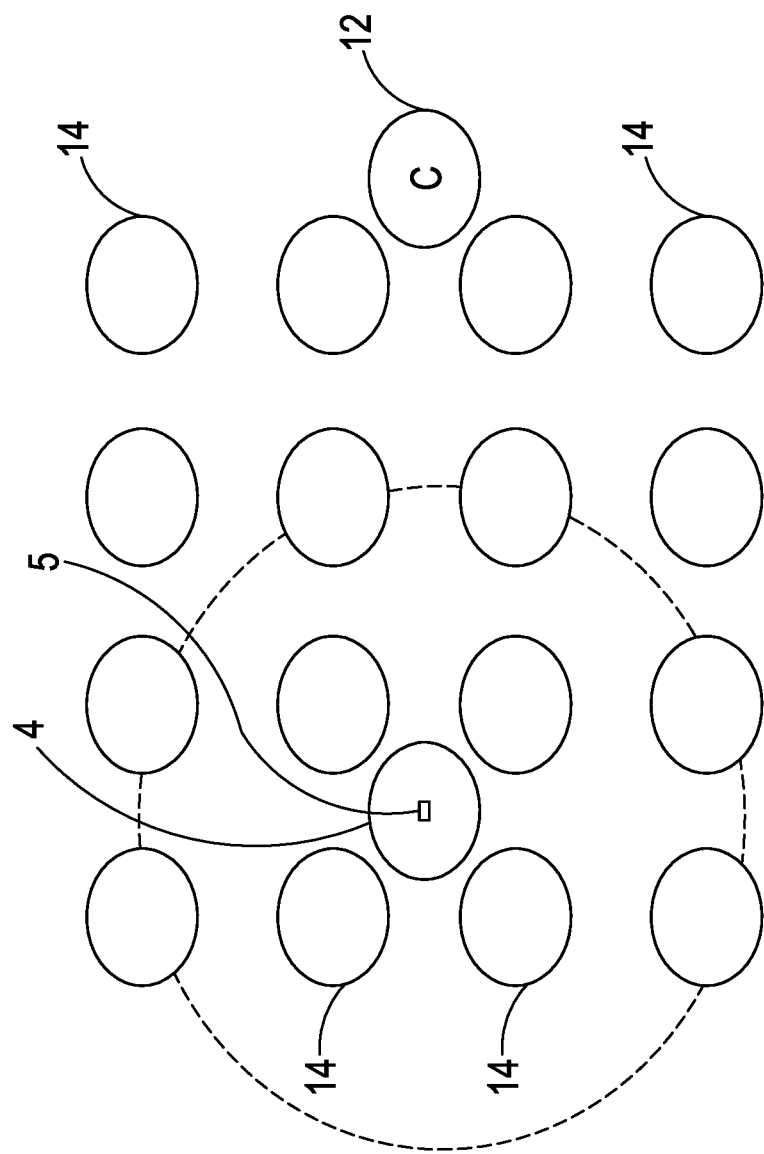
FIG. 15 schematically illustrates an operator utilizing a BLE-enabled device to receive and process beacon signals with a warehouse system.

Please refer to FIG. 1 and FIG. 15. FIG. 15 schematically illustrates an operator utilizing a BLE-enabled device to receive and process beacon signals with a warehouse system. In some embodiments, considering the functionality described above, there are two commercial applications that can be implemented. The first one is a pick-by-light (PBL) system for efficient inventory-picking in a warehouse. The second one is an indoor localization, which can be a supplementary service that is provided by a warehouse system. In some embodiments, a warehouse system includes a wireless sensor network and at least one BLE-enabled device 5. The wireless sensor network includes a control device 12 and at least one mesh module 14. A wireless message is transmitted by the control device 12. The at least one mesh module 14 is wirelessly connected with the control device 12. A Bluetooth Low Energy mesh network is built at least by the connection of the at least one mesh module 14 and the control device 12. The at least one BLE-enabled device 5 is joined the Bluetooth Low Energy mesh network. The at least one mesh module 14 is operated as a beacon submitting beacon signals. The beacon signals are received and processed by the at least one BLE-enabled device 5, so that the at least one BLE-enabled device 5 is localized accurately. On the other hand, the warehouse system allows an operator 4 to track and being provided an optimal route plan through a BLE-enabled device 5. Specifically, the optimal route plan is calculated/computed by the control device 12. The optimal route plan is provided to the BLE-enabled device 5 by the control device 12. The BLE-enabled device 5 is held by the operator 4.

As the devices described above are BLE based, the mesh modules 14 and/or the bridge devices 13 are simultaneously operated as beacons. The operator 4 as shown in FIG. 15 may use the BLE-enabled device 5 (e.g. a tablet PC or a mobile device) to process these signals to localize himself accurately. High accuracy of one meter using a 2.4 GHz wireless beacon can be achieved in dense networks. In addition, while being utilized to assist the inventory-picking in the warehouse, the at least one mesh module 14 is preferred to be wirelessly triggered, uniquely identified and tagged to inventory in the warehouse, but not limited herein.

Figure 16:
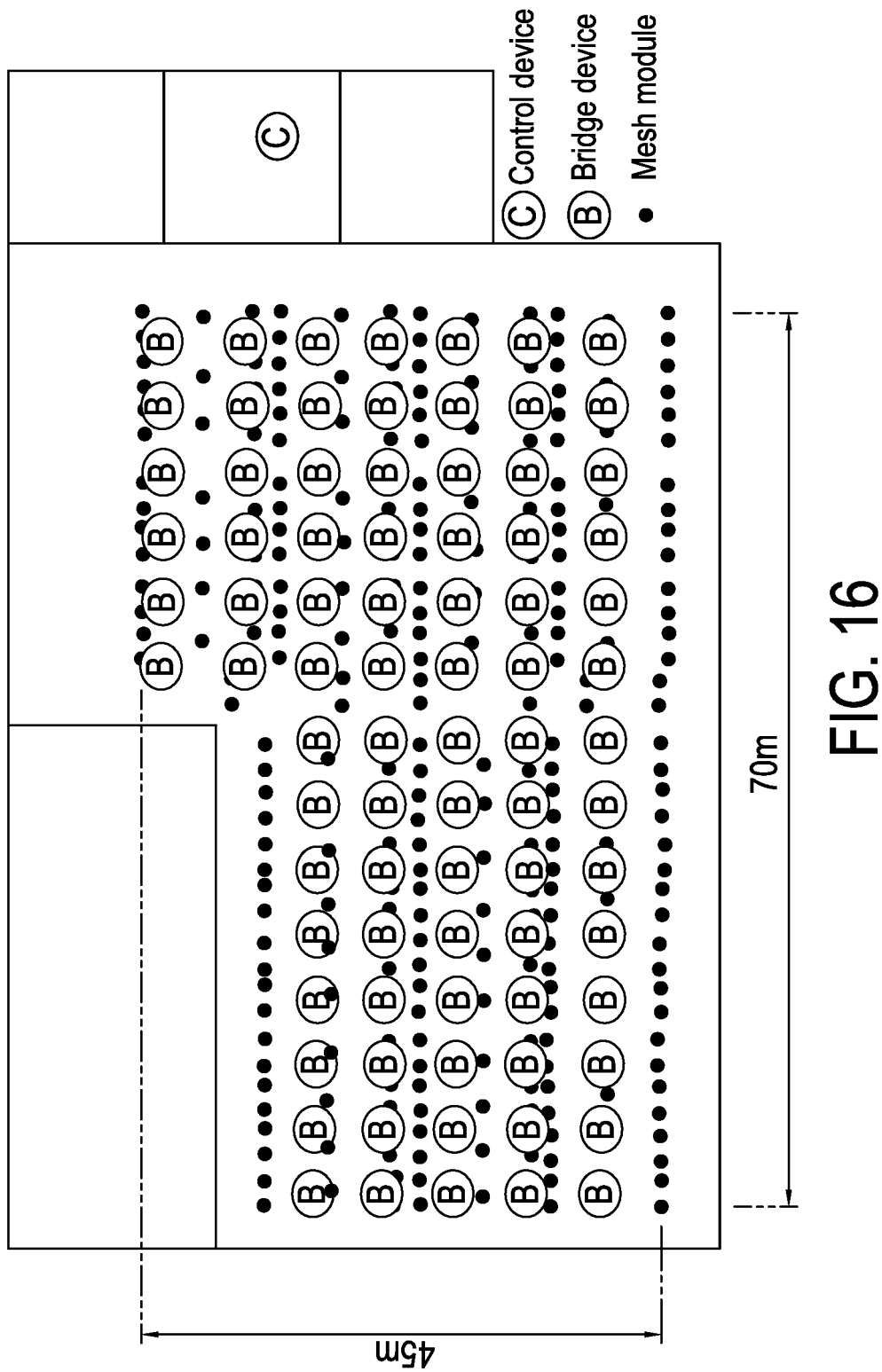
FIG. 16 schematically illustrates a layout of mesh modules in industrial test setup inside a warehouse.

Please refer to FIG. 16. FIG. 16 schematically illustrates a layout of mesh modules in industrial test setup inside a warehouse. As shown in FIG. 16, the bridge devices of the wireless sensor network of the present disclosure are disposed in a matrix arrangement throughout a warehouse. A typical warehouse as shown in FIG. 16 has a dimension of less than 5000 square meters and inventory count in a range between 5000 and 30000. The bridge devices are installed in a grid 5 meter apart, and the mesh modules are placed uniformly across the coverage area as shown in FIG. 16.

From the above discussion, the present disclosure provides a wireless sensor network and a parameter optimization method thereof, and a warehouse system. By utilizing a mesh network, the range and the efficiency of the wireless sensor network are increased. The duty cycle of the mesh module may be less than 10 percent and adjustable to meet the power-consumption demands to save the energy. Meanwhile, the bridge device may be a pure repeating device capable of retransmitting the wireless message through multiple radios, such that there is high probability of the mesh module to receive the wireless message without always turning on. Especially when the wireless sensor network is battery-powered, the lower the duty cycle, the lower the power-consumption. In addition, when the wireless sensor network is mains-powered, the duty cycle of the mesh module can be adjusted to 100 percent, so that the average response time can be extremely shortened. The bridge device can be eliminated under this structure of the wireless sensor network. A mesh network with high efficiency and low cost is achieved. Moreover, comparing with the conventional technologies of prior arts, the present disclosure provides highly resilient and cost effective WSN with verified performance in industrial environment. Since the data can be encrypted, the wireless sensor network has a high security. In addition, an addition mesh module or a defective mesh module can be easily added or removed without change of the structure or the configuration of the WSN. Performance is independent of network size and node locality, in which the WSN can scale up to 65,000 mesh modules. Moreover, a localization as a supplementary service can be implemented.

The present disclosure can be modified by one skilled in the art as various modifications, but none of the modifications is not included within the scope of the claims.

What is claimed is:

1. A wireless sensor network, comprising:
   an aggregator;
   a control device connected with the aggregator;
   at least one bridge device connected with the control device; and
   at least one mesh module wirelessly connected with at least one of the at least one bridge device and the control device, wherein the at least one mesh module comprises a wireless node, wherein the at least one mesh module comprises a pick-by-light node hosting a lighting device capable of showing different colors and the combinations thereof with visibility larger than 10 meters, wherein a mesh network is built by the connections of the at least one mesh module, the at least one bridge device, and the control device, a duty cycle of the at least one mesh module is less than or substantially equal to 10 percent, a command sent by the aggregator is converted into a wireless message by the control device, the wireless message is transmitted by the control device and retransmitted through a first amount of radios and repeated for a second amount of times by the at least one bridge device, the first amount is larger than or substantially equal to 1 and less than or substantially equal to 60, and the second amount is larger than or substantially equal to 2 and less than or substantially equal to 10, so that the wireless message is successfully received by the at least one mesh module.

2. The wireless sensor network according to claim 1, wherein the aggregator is connected with a warehouse management system.

3. The wireless sensor network according to claim 1, wherein the control device comprises a USB dongle based controller.

4. The wireless sensor network according to claim 1, wherein the mesh network comprises a Bluetooth Low Energy mesh network.

5. The wireless sensor network according to claim 1, wherein the bridge device is disposed in a matrix arrangement throughout a warehouse.

6. The wireless sensor network according to claim 5, wherein the at least one mesh module is wirelessly triggered, uniquely identified, and tagged to at least one inventory in the warehouse.

7. The wireless sensor network according to claim 1, wherein the at least one mesh module is powered by a battery, and the duty cycle is adjustable to increase power-saving.

8. The wireless sensor network according to claim 1, wherein an average response time elapsed at the control device from sending the wireless message to receiving a response of the at least one mesh module is less than or substantially equal to 2 seconds.

9. The wireless sensor network according to claim 1, wherein the duty cycle is substantially 5 percent, the first amount is substantially 2, and the second amount is substantially.

10. The wireless sensor network according to claim 1, wherein the amount of the mesh module is more than two, and a distance between any adjacent two of the mesh modules is substantially 5 meters.

11. The wireless sensor network according to claim 1, wherein the at least one mesh module and the at least one bridge device are simultaneously operated as beacons.

12. The wireless sensor network according to claim 1, wherein the control device is physically or wirelessly connected with the aggregator and wirelessly connected with the at least one bridge device.

\* \* \* \* \*